United States Patent

[11] 3,631,624

[72] Inventor Ernest Howard Edde
276 White Bridge Road, Nashville, Tenn. 37209
[21] Appl. No. 2,992
[22] Filed Jan. 15, 1970
[45] Patented Jan. 4, 1972

[54] AUTOMATIC FISHING LURE
1 Claim, 2 Drawing Figs.
[52] U.S. Cl.................................................. 43/35,
43/42.05, 43/42.41
[51] Int. Cl.............................................. A01k 83/00
[50] Field of Search............................................ 43/34, 35,
42.05, 42.41

[56] References Cited
UNITED STATES PATENTS
2,700,842 2/1955 Lehmann...................... 43/35
2,729,013 1/1956 Chandler...................... 43/35
2,589,343 3/1952 Cieslik......................... 43/35
2,010,641 8/1935 Nyvall......................... 43/35

Primary Examiner—Warner H. Camp

ABSTRACT: A fishing lure in which a hook on a fish line is ejected from a protective chamber in a body member by the expansion of a cylindrical helical spring normally held under pressure by a spring loaded trigger also contained within said body, the trigger being uncocked and said ejection spring released when a fish bites the lure.

PATENTED JAN 4 1972 3,631,624

INVENTOR.
ERNEST H. EDDE

AUTOMATIC FISHING LURE

The present invention, while relating to fishing lures in general, has more particular reference to a new and novel trigger controlled spring means whereby a barbed hook normally contained within the body of the lure so as to be free from entanglement with roots, weeds etc. when drawn through the water, ejected and is driven deep into the fish's gullet, this action being occasioned by uncocking of the trigger which immediately occurs as a fish bites the lure.

The main objective of the invention is the provision of a lure that will afford a maximum of pleasure and much less aggravation to the fisherman.

Another object of the invention is the provision of an automatically operable fishing lure attractive in appearance, of few parts, positive in action and inexpensive to manufacture.

To these and other ends as will become apparent from perusal of the following detailed description, the invention consists of certain parts and combination of parts herein set forth, shown in the accompanying drawings and particularly defined in the appended claims.

The drawings illustrating a preferred embodiment of the invention are as follows.

Like numerals of reference indicate similar parts throughout the two views.

Figures 1, 2:
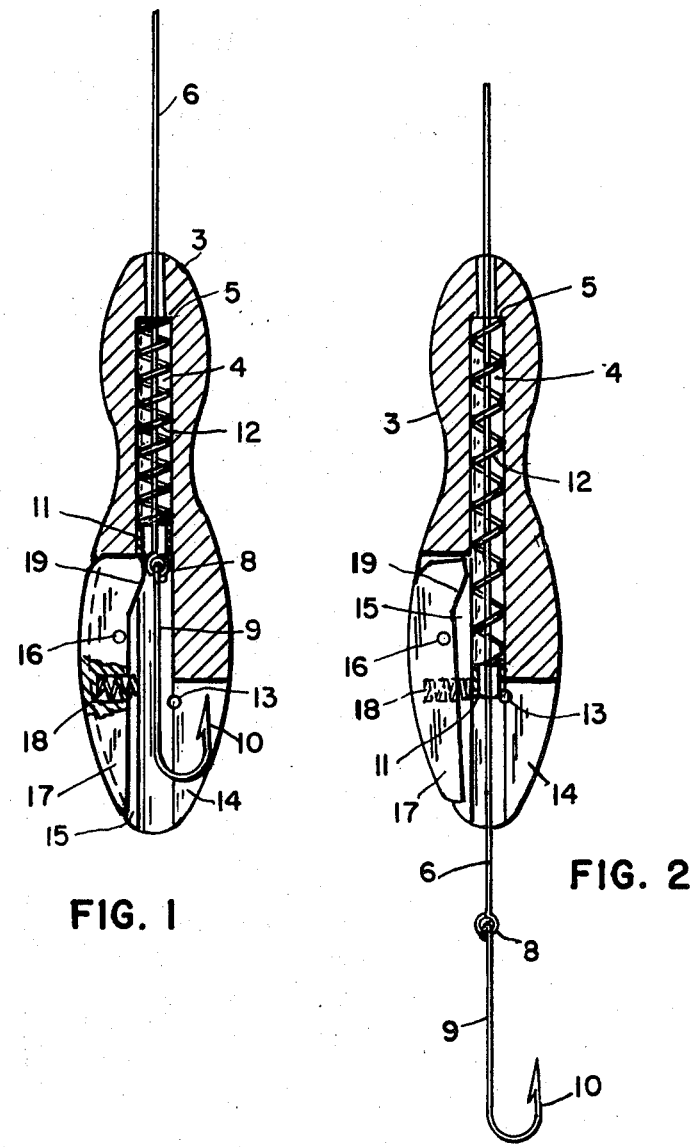
FIG. 1 is a longitudinal central sectional view taken through the body of the lure, movable parts within the body being seen in full lines and in respective casting positions, that is, with the hook releasably housed within the body.
FIG. 2 is a view similar to FIG. 1 but with the hook ejected to its released position.

In this instance the body 3 of the lure in contour simulates that of a small fish such as used for bait.

Extending longitudinally through the body 3 from end to end is a bore 4 the forward portion of which for a short distance is reduced in diameter to provide a shoulder 5, a fishing line 6 extending through the bore 4 having link connection at its rear end with the eye 8 on the shank 9 of a standard fish hook 10. Slideably fitted in the bore 4 is a short bushing 11 in the form of a sleeve and interposed between this sleeve 11 and the shoulder 5 is a cylindrical helical spring 12. Anchored in the body 3 is a transverse pin 13 which acts both as a guide for the shank 9 of hook 10 and limiting stop as the hook by expansion of spring 12 is ejected from its casting position in the body 3, see FIG. 1, to its released position shown in FIG. 2. The lower part of the body 3 is formed to provide two diametrically opposed openings 14 and 15, the opening 14 providing a chamber within which the hook 10 is contained and made inactive when in casting position. That is, the lure will not become snagged when drawn through the water.

Fulcrumed intermediate its ends on a transverse pin 16 spanning the body opening 15 is a spring loaded elongated trigger 17 of flat stock, this trigger when cocked, as in FIG. 1, prevents rearward movement of the sleeve 11 and thus holds the spring 12 under compression. A laterally extending compression spring 18 housed within the trigger 17 normally holds the latter in cocked position. The inner edge of the trigger at its forward end terminates in a cam surface 19 which, when a fish bites the body 3 and with it the slightly protruding outer side edge of the trigger, releases the trigger which immediately becomes uncocked and allows expansion of spring 12 to thrust the hook 10 into the gullet of the fish.

Operation of the lure is as follows:

An outward pull on the line 6 draws the hook 10 and sleeve 11 against the spring 12 thus placing the latter under compression, and permitting the spring loaded trigger 17 to automatically snap into cocked position under the sleeve 11. The lure is then ready for casting. When a fish bites the body of the lure trigger 17 pivots on pin 16 and becomes uncocked, engagement of the eye 8 on the shank of hook 12 with the cam surface 19 preventing accidental recocking of the trigger.

What I claim is:

1. In a fishing lure, the combination of an elongated body having a longitudinal bore extending from end to end, the forward portion of said bore for a short distance being of reduced diameter to provide a shoulder, a fishing line extending through said bore and having a link connection at its rear end with an eye on the shank of a fish hook, a sleeve axially slideable in said bore, a cylindrical helical spring extending between said shoulder and the said sleeve, said sleeve being held slideable captive within said bore of said body so to limit the expansion of said spring, means within said body to normally retain the said helical spring under compression, such latter means being automatically released by a fish biting said body and thus permitting expansion of the said helical spring to thrust the said fish hook rearwardly into the gullet of said fish, a transverse stop pin partly blocking said bore so to limit the travel of said slideably captive sleeve, an elongated trigger fulcrumed intermediate its opposite ends on a second transverse pin which is on an opposite side of said bore from that of the said stop pin, said trigger comprising a bar of flat stock which at one end has a corner positioned adjacent a rear edge of said sleeve and an opposite end extending outwardly of said body when in a cocked position so that when a fish depresses said outward extended end, the said corner is pivoted away to free said sleeve for sliding rearwardly up to said stop pin, said outwardly extending end of said trigger when in a cocked position being thus maintained by a second helical coil spring which is on a plane at right angle to the first said helical coil spring, said body having two portions at its rear extremity cut away to form openings, one opening providing a chamber in which said hook is housed when the lure is set for casting and the other said opening permitting oscillating movement of said trigger partly contained in said opening, and said body in contour being a simulation of a small fish such as are used by anglers for bait.

* * * * *